(12) United States Patent
Pan et al.

(10) Patent No.: US 11,841,218 B2
(45) Date of Patent: Dec. 12, 2023

(54) SYSTEM AND METHOD OF MEASURING SURFACE TOPOGRAPHY

(71) Applicants: Shih-Yao Pan, Taoyuan (TW);
Chih-Yao Ting, Taoyuan (TW);
Chia-Hung Lin, Taoyuan (TW);
Hsin-Yun Chang, Taoyuan (TW)

(72) Inventors: Shih-Yao Pan, Taoyuan (TW);
Chih-Yao Ting, Taoyuan (TW);
Chia-Hung Lin, Taoyuan (TW);
Hsin-Yun Chang, Taoyuan (TW)

(73) Assignee: Chroma ATE Inc., Taoyuan (TW)

( * ) Notice: Subject to any disclaimer, the term of this patent is extended or adjusted under 35 U.S.C. 154(b) by 159 days.

(21) Appl. No.: 17/377,439

(22) Filed: Jul. 16, 2021

(65) Prior Publication Data

US 2022/0018656 A1 Jan. 20, 2022

(30) Foreign Application Priority Data

Jul. 17, 2020 (TW) ................................. 109124147

(51) Int. Cl.
*G01B 11/30* (2006.01)
(52) U.S. Cl.
CPC .................. *G01B 11/303* (2013.01)
(58) Field of Classification Search
CPC .............. G01B 11/303; G01B 9/02032; G01B 9/02087
See application file for complete search history.

(56) References Cited

U.S. PATENT DOCUMENTS

| | | | | |
|---|---|---|---|---|
| 5,151,750 | A | * | 9/1992 | Magome ............... G03F 9/7049 257/797 |
| 6,534,756 | B1 | * | 3/2003 | Grimbergen ......... G02B 6/4298 250/239 |
| 2013/0271773 | A1 | * | 10/2013 | Shirai ..................... G01D 5/38 356/499 |
| 2022/0397392 | A1 | * | 12/2022 | Courteville .......... G01B 9/0209 |

OTHER PUBLICATIONS

P. Montgomery et al., "Implementation of a fringe visibility based algorithm in coherence scanning interferometry for surface roughness measurement", Proceedings of SPIE, vol. 8788G (2013) (Year: 2013).*

* cited by examiner

*Primary Examiner* — Hina F Ayub

(57) ABSTRACT

Herein disclosed are a surface topography measuring system and a method thereof. The method comprises the following steps: dividing a test beam into a first sub-beam, entering a reflecting mirror along a first axis, and a second sub-beam, entering an object surface along a second axis; moving the reflecting mirror for reflecting the first sub-beam at different positions on the first axis to generate N reflected beams; generating an object reflected beam, related to the second sub-beam, reflected from the object surface; generating N images, related to the N reflected beams and the object reflected beam, and each of the N images having a plurality of interference fringes; analyzing the interference fringes in each of the N images to calculate N curve formulas; calculating a surface topography of the object surface from the N curve formulas.

4 Claims, 5 Drawing Sheets

SYSTEM AND METHOD OF MEASURING SURFACE TOPOGRAPHY

CROSS REFERENCE TO RELATED APPLICATION

The present application claims priority to Taiwan patent application Serial No. 109124147 filed on, Jul. 17, 2020, the entire content of which is incorporated by reference to this application.

BACKGROUND OF THE INVENTION

1. Field of the Invention

The present invention pertains to a system and a method for measuring a surface topography, in particular to the system and the method for measuring a surface topography by utilizing interference fringes.

2. Description of the Prior Art

After a product is manufactured, it will go through test procedures to check the quality of the product. In some test procedures, it is necessary to confirm the quality of the product surface, for example, the flatness of the product surface or the microstructure on the product surface may be checked. In general, various testing devices might be used to inspect the product surface in the related test procedures. For example, a camera can be used to photograph the product surface, and then the captured image can be enlarged to inspect a specific area on the product surface.

Traditionally, an interferometer is usually used to measure the flatness of the product surface. Person having ordinary skill in the art can understand that the interferometer divides a beam of light into two sub-beams, makes the product surface reflect one of the sub-beams, and moves a reflecting mirror to change the optical path of the other sub-beam. And finally, the optical path difference and the phase difference of the two sub-beams are measured to calculate the topography of the product surface. However, if the plane accuracy requirements of the topography are high, the error caused by moving the reflecting mirror in mechanical way will be particularly highlighted, and the topography of the product surface cannot be inspected correctly due to the error. In view of the limitation of plane accuracy of traditional interferometers, the industry needs a new surface topography system and method thereof that can support higher plane accuracy.

SUMMARY OF THE INVENTION

The present invention provides a method of measuring surface topography that can eliminate errors when moving the reflecting mirror, so that the surface topography can be measured correctly.

The present invention discloses a method of measuring surface topography comprising the following steps: dividing a test beam into a first sub-beam, entering a reflecting mirror along a first axis, and a second sub-beam, entering an object surface along a second axis; moving the reflecting mirror for reflecting the first sub-beam at different positions on the first axis to generate N reflected beams; generating an object reflected beam, related to the second sub-beam, reflected from the object surface; generating N images, related to the N reflected beams and the object reflected beam, and each of the N images having a plurality of interference fringes; analyzing the interference fringes in each of the N images to calculate N curve formulas; calculating a surface topography of the object surface from the N curve formulas. Wherein a first angle is between a first normal line of the reflecting mirror and the first axis, or between a second normal line of the object surface and the second axis, N is a positive integer greater than 2.

In some embodiment, the test beam has a first wavelength, and in the step of moving the reflecting mirror for reflecting the first sub-beam at the different positions on the first axis to generate the N reflected beams can further comprise: setting an $i^{th}$ setting position of the reflecting mirror on the first axis to generate an $i^{th}$ reflected beam among the N reflected beams; setting an $i+1^{th}$ setting position of the reflecting mirror on the first axis to generate an $i+1^{th}$ reflected beam among the N reflected beams. Wherein the $i^{th}$ setting position and the $i+1^{th}$ setting position are separated by one-eighth of the first wavelength, i is a positive integer smaller than N. In addition, in the step of analyzing the interference fringes in each of the N images to calculate the N curve formulas can further comprises: selecting a reference line perpendicular to the interference fringes in each of the N images; calculating each of the N curve formulas by curve-fitting the interference fringes on the reference line.

In some embodiment, in the step of calculating each of the N curve formulas by curve-fitting the interference fringes on the reference line, an $i^{th}$ phase error value between the $i^{th}$ reflected beam and the $i+1^{th}$ reflected beam may also be obtained during curve-fitting the interference fringes on the reference line. Besides, each of the N curve formulas may comprise a level parameter, an amplitude parameter, and a phase parameter, and the phase parameter is related to the surface topography of the object surface and the $i^{th}$ phase error value.

The present invention provides a surface topography measuring system that can eliminate errors when moving the reflecting mirror, so that the surface topography can be measured correctly.

The present invention discloses a surface topography measuring system for measuring a surface topography on an object surface. The surface topography measuring system comprises a light source, a reflecting mirror, a beam splitter, a photographing device, and a processing device. The light source provides a test beam. The reflecting mirror selectively moves to different positions on a first axis. The beam splitter divides the test beam into a first sub-beam, entering the reflecting mirror along a first axis, and a second sub-beam, entering the object surface along a second axis. The photographing device receives the first sub-beam reflected from the reflecting mirror on the first axis, and receives the second sub-beam reflected from the object surface to generate N images. The first sub-beam reflected from different positions of the reflecting mirror are defined as N reflected beams, and the second sub-beam reflected from the object surface is defined as an object reflected beam, and the N images are related to the N reflected beams and the object reflected beam, and each of the N images has a plurality of interference fringes. The processing device, electrically connected to the photographing device, analyzes the interference fringes in each of the N images to calculate N curve formulas, and calculates the surface topography of the object surface from the N curve formulas. Wherein a first angle is between a first normal line of the reflecting mirror and the first axis, or between a second normal line of the object surface and the second axis, N is a positive integer greater than 2.

In some embodiment, the test beam has a first wavelength, the reflecting mirror may generate an $i^{th}$ reflected beam among the N reflected beams at an $i^{th}$ setting position on the first axis, and the reflecting mirror may generate an $i+1^{th}$ reflected beam among the N reflected beams at an $i+1^{th}$ setting position on the first axis. The $i^{th}$ setting position and the $i+1^{th}$ setting position are separated by one-eighth of the first wavelength, i is a positive integer smaller than N. Besides, the processing device may further select a reference line perpendicular to the interference fringes in each of the N images, and calculate each of the N curve formulas by curve-fitting the interference fringes on the reference line. In addition, the processing device may obtain an $i^{th}$ phase error value between the $i^{th}$ reflected beam and the $i+1^{th}$ reflected beam during curve-fitting the interference fringes on the reference line. Each of the N curve formulas may comprise a level parameter, an amplitude parameter, and a phase parameter, and the phase parameter is related to the surface topography of the object surface and the $i^{th}$ phase error value.

Based on the above, the method and the system of measuring surface topography provided by the present invention can ensure that the image captured by the photographing device has multiple interference fringes, because the reflecting mirror or object surface is inclined, the first sub-beam or the second sub-beam does not enter the reflecting mirror or object surface perpendicularly. In addition, the processing device can eliminate the phase error value related to the moved reflecting mirror through calculation, so that the surface topography can be measured correctly.

BRIEF DESCRIPTION OF THE APPENDED DRAWINGS

DETAILED DESCRIPTION OF THE INVENTION

The features, objections, and functions of the present invention are further disclosed below. However, it is only a few of the possible embodiments of the present invention, and the scope of the present invention is not limited thereto; that is, the equivalent changes and modifications done in accordance with the claims of the present invention will remain the subject of the present invention. Without departing from the spirit and scope of the invention, it should be considered as further enablement of the invention.

Figure 1:
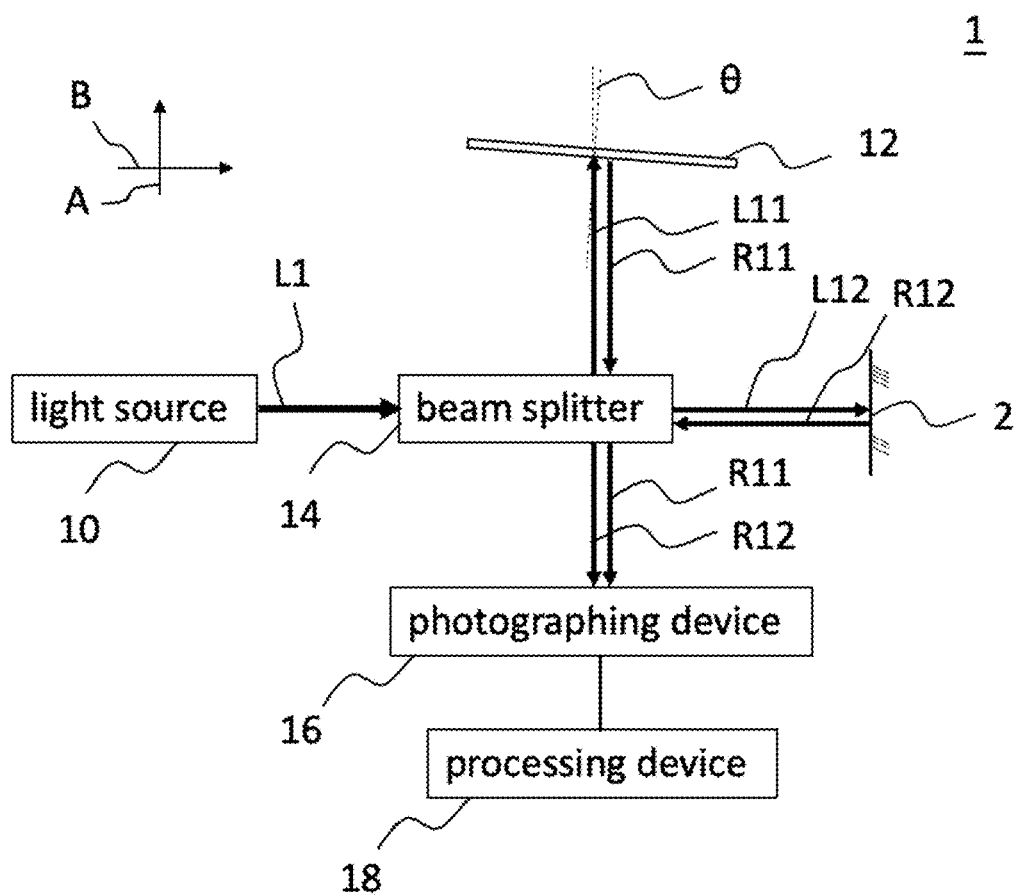
FIG. 1 is a block diagram of the surface topography measuring system in accordance with an embodiment of the present invention.

Please refer to FIG. 1, FIG. 1 is a block diagram of the surface topography measuring system in accordance with an embodiment of the present invention. As shown in FIG. 1, the surface topography measuring system 1 is an optical system and can be used to measure the surface topography of an object surface 2. This embodiment does not limit the type of the object surface 2. For example, it may be, or part of, the surface of a wafer, a chip, or a mechanical part. In practice, the surface topography measuring system 1 of this embodiment can support higher plane accuracy, but it is not limited to only measuring the flat object surface 2, but also the surface topography measuring system 1 of this embodiment can measure curved surfaces. The surface topography measuring system 1 may comprise a light source 10, a reflecting mirror 12, a beam splitter 14, a photographing device 16, and a processing device 18, and the light source 10, the reflecting mirror 12, the beam splitter 14, the photographing device 16 and the processing device 18 can be, but not limited to, installed in one housing. The photographing device 16 and the processing device 18 can be electrically connected in a wired or wireless manner, the processing device 18, for example, can be arranged at a remote end. In an example, the surface topography measuring system 1 may also include a lens, a filter or other optical elements, which is not limited in this embodiment. The components of the surface topography measuring system 1 are described below.

The light source 10 is used to provide a test beam L1. The test beam L1 may be a laser light having a single wavelength, e.g., a first wavelength. The wavelength of the test beam L1 is not limited in this embodiment. As shown in FIG. 1, the light source 10 emits the test beam L1 along a second axis B into the beam splitter 14. Then, the beam splitter 14 can divide the test beam L1 into a first sub-beam L11 and a second sub-beam L12. The first sub-beam L11 enters the reflecting mirror 12 along a first axis A, and the second sub-beam L12 enters the object surface 2 along the second axis B. Person having ordinary skill in the art should understand that the function of the beam splitter 14 is to divide the test beam L1 into two identical sub-beams, that is, the first sub-beam L11 and the second sub-beam L12 have substantially the same light intensity and the same wavelength. And, the first sub-beam L11 and the second sub-beam L12 can be respectively directed to the first axis A and the second axis B which are perpendicular to each other. It is worth mentioning that although FIG. 1 illustrates that the light source 10, the beam splitter 14, and the object surface 2 are all on the second axis B, the reflecting mirror 12 and the object surface 2 may also be interchanged, so that the object surface 2 is on the first axis A, and the light source 10, the beam splitter 14, and the reflecting mirror 12 are on the second axis B.

The reflecting mirror 12 can be selectively moved to different positions on the first axis A, and the reflecting mirror 12 can be used to reflect the first sub-beam L11. The reflected first sub-beam L11 can be defined as a reflected beam R11. In practice, there are N setting positions on the first axis A, and the reflecting mirror 12 can be driven to move to one of the N setting positions. In an example, the distance between two adjacent setting positions among the N setting positions can be preset. When the first wavelength is $\lambda$, the distance can be $\lambda/8$, that is, one-eighth of the first wavelength of the test beam L1. The N setting positions of the reflecting mirror 12 are related to the optical path of the first sub-beam L11, especially the distance between the reflecting mirror 12 and the beam splitter 14. For example, assuming that a setting position ($i^{th}$ setting position) of the reflecting mirror 12 on the first axis A reflects the first sub-beam L11, the reflected beam R11 will be generated. Then, when the reflecting mirror 12 moves forward (or backward) by one-eighth of the first wavelength on the first axis A, and the reflecting mirror 12 will reflect the first sub-beam L11 at the next setting position (i+1$^{th}$ setting position), and the next reflected beam R11 will be generated.

Because of the overlap of the optical paths on the first axis A, although the distance between the reflecting mirror 12 and the beam splitter 14 at the i+i$^{th}$ setting position is less (or more) than the distance between the reflecting mirror 12 and the beam splitter 14 at the i$^{th}$ setting position by one-eighth of the first wavelength. Person having ordinary skill in the art should understand that the optical path of the second (i+i$^{th}$) reflected beam R11 will be longer (or less) than that of the first (i$^{th}$) reflected beam R11 by a quarter of the first wavelength (twice of one-eighth of the first wavelength). This means that the phases of the second reflected beam R11 and the first reflected beam R11 are different by 90 degrees (that is, π/2). In practice, the reflecting mirror 12 can have more than 3 setting positions. Person having ordinary skill in the art should understand that the four-step phase shift method or the seven-step phase shift method usually used in the measurement are corresponding to the reflecting mirror 12 having 4 setting positions or 7 setting positions. Taking the four-step phase shift method as an example, the reflecting mirror 12 will also reflect the first sub-beam L11 at the third (for example, i+2$^{th}$) setting position on the first axis A, and will generate the third (i+2$^{th}$) reflected beam R11. And, the reflecting mirror 12 will also reflect the first sub-beam L11 at the fourth (or example, i+3$^{th}$) setting position on the first axis A, and will generate the fourth (i+3$^{th}$) reflected beam R11. In other words, the phases of the first to fourth reflected beams R11 are sequentially different by 90 degrees (i.e., π/2).

Continuing the above, taking the object surface 2 on which the second sub-beam L12 is incident as an example, the object surface 2 can also reflect the second sub-beam L12 back, and the reflected second sub-beam L12 is defined as an object reflected beam R12. Unlike the reflecting mirror 12 that moves to the N setting positions, the relative distance between the object surface 2 and the beam splitter 14 can be kept fixed, so that the phase of the object reflected beam R12 should be the same at any time. In practice, person having ordinary skill in the art can understand that it is also possible to fix the relative distance between the reflecting mirror 12 and the beam splitter 14, and change the relative distance between the object surface 2 and the beam splitter 14. This embodiment is described by the reflecting mirror 12 which moves between N setting positions as an example. In addition, the reflected beam R11 and the object reflected beam R12 will be directed to the photographing device 16 through the beam splitter 14, so that the photographing device 16 will receive the reflected beam R11 and the object reflected beam R12 to generate N images. Taking the above-mentioned four-step phase shift method as an example, the first to fourth images generated by the photographing device 16 can respectively correspond to the first reflected beam R11 and the object reflected beam R12, the second reflected beam R11 and the object reflected beam R12, the third reflected beam R11 and the object reflected beam R12, the fourth reflected beam R11 and the object reflected beam R12, and so on.

In practice, because the normal line (first normal line) of the reflecting mirror 12 and the first axis A sandwich an angle θ (the first angle), the purpose of the angle θ is to ensure that the image produced by the photographing device 16 will have interference fringes. In an example, assuming that the normal line of the reflecting mirror 12 does not have an angle θ with the first axis A, or that the normal line of the reflecting mirror 12 overlaps the first axis A, it cannot be guaranteed that interference fringes will be in the image generated by the photographing device 16. Since the interference fringes are the basis for inspecting the surface topography of the object surface 2 in this embodiment, the angle θ between the normal line (the first normal line) of the reflecting mirror 12 and the first axis A shall have practical meaning. Furthermore, in view of the first image, the first reflected beam R11 and the object reflected beam R12 will interfere with each other, and there will be multiple interference fringes in the first image. Similarly, for the second to fourth images, the second to fourth reflected beam R11 and the object reflected beam R12 will also cause interference, and there will also be multiple interference fringes in the second to fourth images. In order to analyze these images, the photographing device 16 is electrically connected to the processing device 18. The processing device 18 converts the interference fringes in each image into the corresponding curve formula, and calculates the correlation with the surface topography of the object surface 2 from these curve formulas.

Figure 2A:
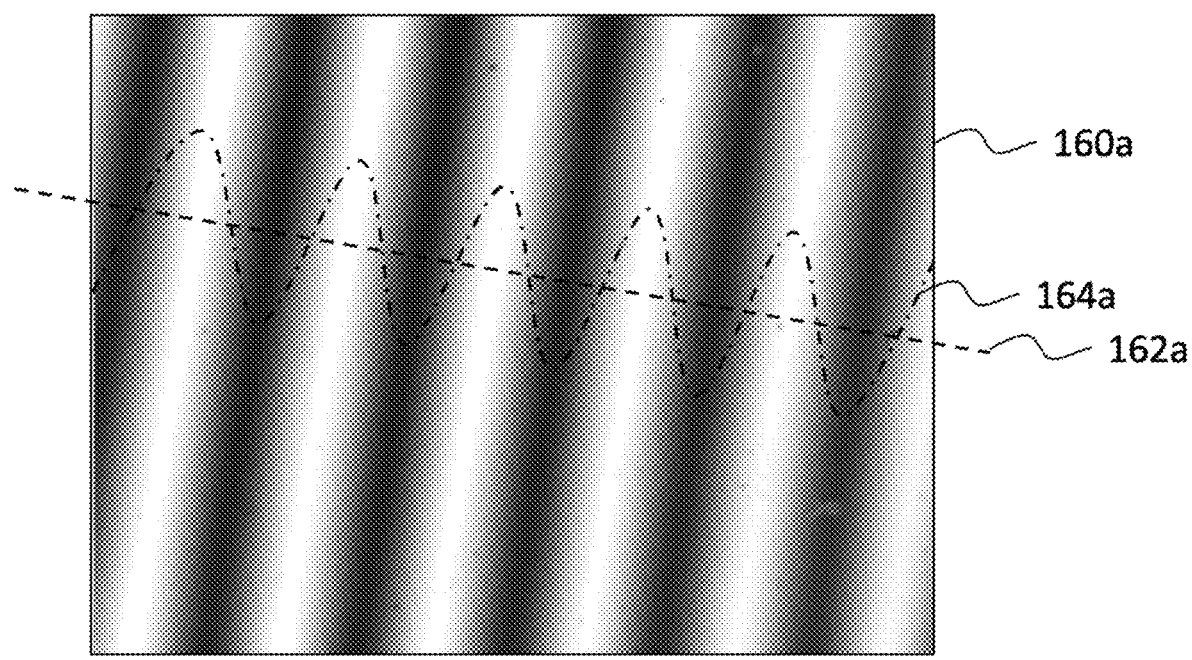
FIG. 2A is a schematic diagram showing an image with multiple interference fringes in accordance with an embodiment of the present invention.
Figure 2B:
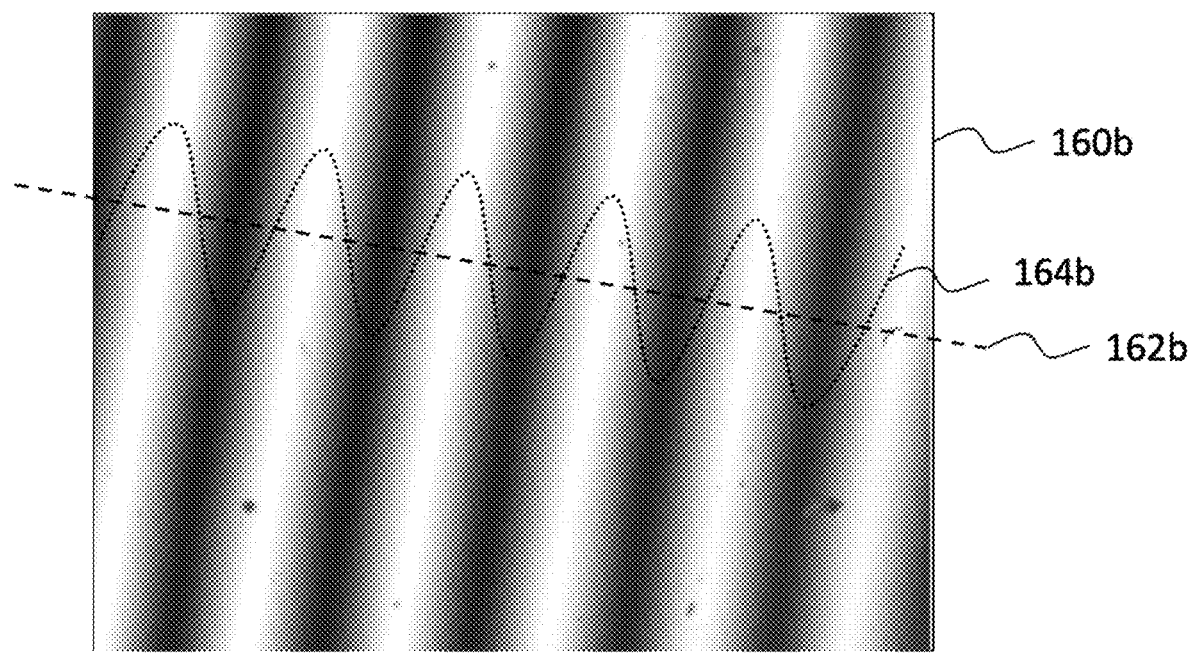
FIG. 2B is a schematic diagram showing another image with multiple interference fringes in accordance with an embodiment of the present invention.

In one example, the processing device 18 will process the images from the photographing device 16 in the first place, especially to extract the curve formula associated with the interference fringes from each image. In order to explain how to extract the curve formula related to the interference fringes from the image, please refer to FIG. 2A and FIG. 2B together. FIG. 2A is a schematic diagram showing an image with multiple interference fringes in accordance with an embodiment of the present invention. FIG. 2B is a schematic diagram showing another image with multiple interference fringes in accordance with an embodiment of the present invention. Assuming that the first image generated by the photographing device 16 is the image 160a shown in FIG. 2A, and the processing device 18 selects a reference line 162a in the image 160a. Here, the reference line 162a should be perpendicular to the interference fringes in the image 160a, so that there will be regular bright and dark values on the reference line 162a. Then, the processing device 18 can apply curve-fitting to the interference fringes on the reference line 162a to generate a sine wave 164a. The crest of the sine wave 164a may be the center of the light line in the interference fringes, and the trough of the sine wave 164a may be the center of the dark line in the interference fringes. Similarly, assuming that the second image generated by the photographing device 16 is the image 160b shown in FIG. 2B, the processing device 18 will also select a reference line 162b in the image 160b. In addition, the reference line 162b will also be perpendicular to the interference fringes in the image 160b, so that the reference line 162b will have regular bright and dark values. The processing device 18 will also apply curve-fitting to the interference fringes on the reference line 162b to generate a sine wave 164b. Taking the aforementioned four-step phase shift method as an example, the processing device 18 can respectively calculate the curve formulas corresponding to the sine waves in the four images.

For example, the processing device 18 may input the light and dark values on the reference line 162a into a calculation program, such as a commonly used matlab program, which can apply curve-fitting to the light and dark values on the reference line 162a. By analogy, the processing device 18 can calculate the four curve formulas corresponding to the first to fourth images, for example, the following formulas (1)~(4).

$$I_1(x,y)=I'(x,y)+I''(x,y)\cos[\phi(x,y)] \quad (1)$$

$$I_2(x,y)=I'(x,y)+I''(x,y)\cos[\phi(x,y)+\varepsilon_1] \quad (2)$$

$$I_3(x,y)=I'(x,y)+I''(x,y)\cos[\phi(x,y)+\varepsilon_1+\varepsilon_2] \quad (3)$$

$$I_4(x,y)=I'(x,y)+I''(x,y)\cos[\phi(x,y)+\varepsilon_1+\varepsilon_2+\varepsilon_3] \quad (4)$$

It is illustrated by formula (1), where $I_1(x,y)$ is used to represent the sine wave fitted by the interference fringes in the first image, and $I'(x,y)$ is used to represent the level parameter (or DC offset) corresponding to the sine wave, $I''(x,y)$ is used to represent the amplitude parameter corresponding to the sine wave, and $\cos[\phi(x, y)]$ is used to represent the phase parameter corresponding to the sine wave. Wherein $\phi(x,y)$ is related to the surface topography of the object surface 2. It can be seen from formulas (1) and (2) that the sine wave $I_2(x,y)$ in formula (2) not only has the level parameter $I'(x, y)$ and the amplitude parameter $I''(x, y)$, but also has $\varepsilon 1$ which is defined as the first phase error value. In the foregoing example of this embodiment, it is mentioned that the reflecting mirror 12 can be set between the N setting positions, and the N setting positions can be understood as the positions where the reflecting mirror 12 is expected to be moved. However, the reflecting mirror 12 might not be able to move to the N setting positions accurately. Person having ordinary skill in the art can understand that the level parameter $I'(x, y)$ and the amplitude parameter $I''(x, y)$ should be the same in formulas (1)~(4). The reason is that the difference between the first to the fourth reflected beam R11 should be the optical path, but the level and the amplitude should be the same. In addition, $\cos[\phi(x,y)]$ (the phase parameter) is only related to the surface topography of the object surface 2, and it should also be the same in formulas (1)~(4).

Figure 2C:
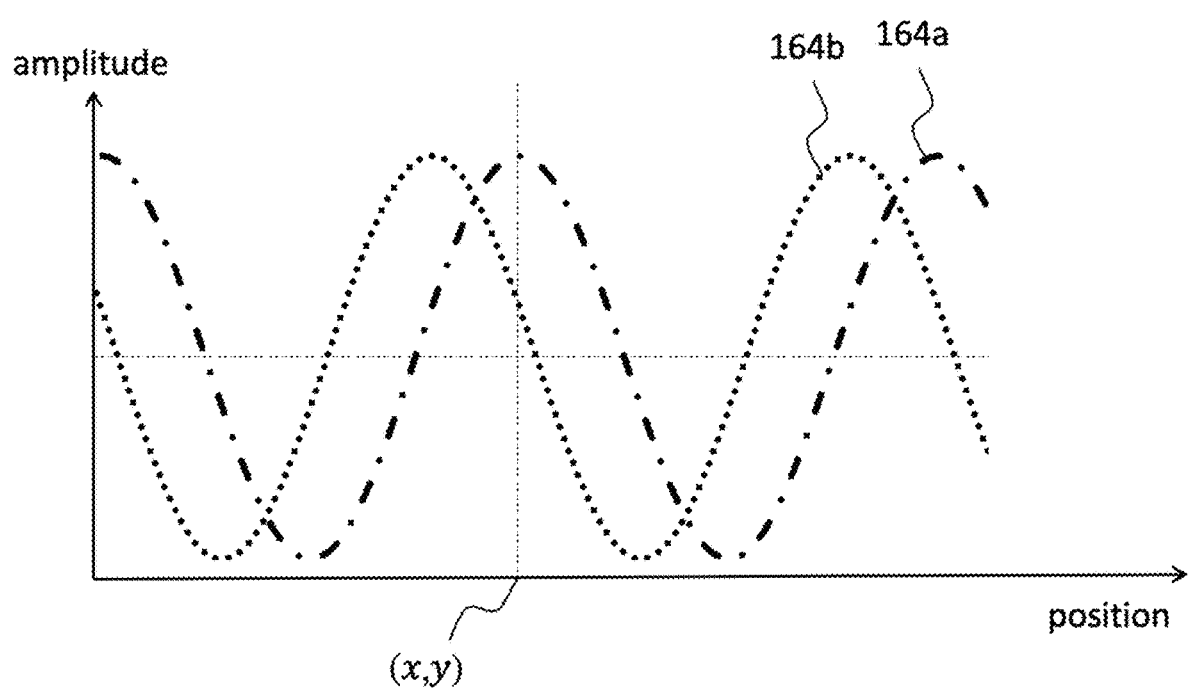
FIG. 2C is a schematic diagram showing sine waves after curve-fitting interference fringes in accordance with an embodiment of the present invention.

There is also a reason for the phase parameter comprises the first phase error value $\varepsilon_1$, which is briefly described in this embodiment as follows. Please refer to FIG. 2A to FIG. 2C together. FIG. 2C is a schematic diagram showing sine waves after curve-fitting interference fringes in accordance with an embodiment of the present invention. As described in the previous embodiment, it is assumed that the first setting position and the second setting position of the reflecting mirror 12 are ideally separated by one-eighth of the first wavelength ($\lambda/8$), that is, the optical path difference between the second reflected beam R11 and the first reflected beam R11 should be ideally a quarter of the first wavelength ($\lambda/4$). It can be inferred that the phase difference between the second reflected beam R11 and the first reflected beam R11 will be 90 degrees ($\pi/2$). In other words, the phase of a sine wave 164a in the image 160a and a sine wave 164b in the image 160b may theoretically differ by 90 degrees (7r/2). In this embodiment, a peak of the sine wave 164a is selected, for example, at the position (x,y) in FIG. 2C. Theoretically, the phase difference between the sine wave 164a and the sine wave 164b is 90 degrees, and the peak of the sine wave 164a corresponds to the amplitude zero of the sine wave 164b. In practice, the moving of the reflecting mirror 12 along the first axis A can be controlled by a piezoelectric element (or made of piezoelectric material). Although the piezoelectric element is relatively precise, the ideal piezoelectric element, however, is not exist. Therefore, every time the piezoelectric element moves the reflecting mirror 12 might comprise an error, which causes the peak of the sine wave 164a might not be exactly aligned with the amplitude zero of the sine wave 164b. In other words, the response (degree of displacement) of the piezoelectric element while giving an external voltage might not be necessarily the same each time, resulting in the fact that the distance between the first setting position and the second setting position will not be exactly one-eighth of the first wavelength. ($\lambda/8$). This is the reason why this embodiment adds a phase error value $\varepsilon_1$ between the formula (1) corresponding to the sine wave 164a and the formula (2) corresponding to the sine wave 164b.

Similarly, another error would exist in the distance between the second setting position and the third setting position, that is, the phase difference between the third reflected beam R11 and the second reflected beam R11 will be 90 degrees ($\pi/2$) plus a phase error value $\varepsilon 2$. It is worth mentioning that, since the second setting position itself has an error, in addition to the phase error value $\varepsilon 2$, the formula (3) also comprises the phase error value $\varepsilon 1$. Besides, there would also be an error in the distance between the third setting position and the fourth setting position. The phase difference of the fourth reflected beam R11 and the third reflected beam R11 will be 90 degrees ($\pi/2$) plus a phase error value $\varepsilon 3$. Furthermore, in addition to the phase error value $\varepsilon 3$ in the formula (4), the phase error value $\varepsilon 1$ and the phase error value $\varepsilon 2$ are also comprised at the same time. Person having ordinary skill in the art can understand that, when this embodiment applies curve-fitting to multiple interference fringes in the first to fourth images, the phase error value $\varepsilon 1$, the phase error value $\varepsilon 2$, and the phase error value $\varepsilon 3$ will be calculated. That is, the sine waves $I_1(x, y)$ to $I_4(x, y)$ in formulas (1) to (4) are directly derived from the interference fringes on the reference line of the first to fourth images, and the phase error value $\varepsilon 1$, the phase error value $\varepsilon 2$, and the phase error value $\varepsilon 3$ are derived from during curve-fitting as known variables in the formulas. In contrast, the unknown variables in formulas (1) to (4) are limited to the level parameter $I'(x,y)$, the amplitude parameter $I''(x,y)$, and the phase parameter $\cos[\phi(x,y)]$. That is to say, if the present embodiment is based on the four-step phase shift method to obtain formulas (1) to (4), we can guarantee that the above three unknown variables can be solved by using formulas (1) to (4). Therefore, the phase parameter $\cos[\phi(x, y)]$ can be solved, and the surface topography of the object surface 2 can be derived from the solved phase parameter $\cos[\phi(x,y)]$.

Person having ordinary skill in the art can understand that the three unknown variables only need three corresponding formulas to find the solution. According to this, whether it is the commonly used four-step phase shift method (there are four formulas as mentioned above) or the seven-step phase shift method (there will be seven formulas) should have enough information to deduce the surface topography of the object surface 2. In other words, either the four-step phase shift method or the seven-step phase shift method can be used in this embodiment to measure the surface topography of the object surface 2.

Figure 3:
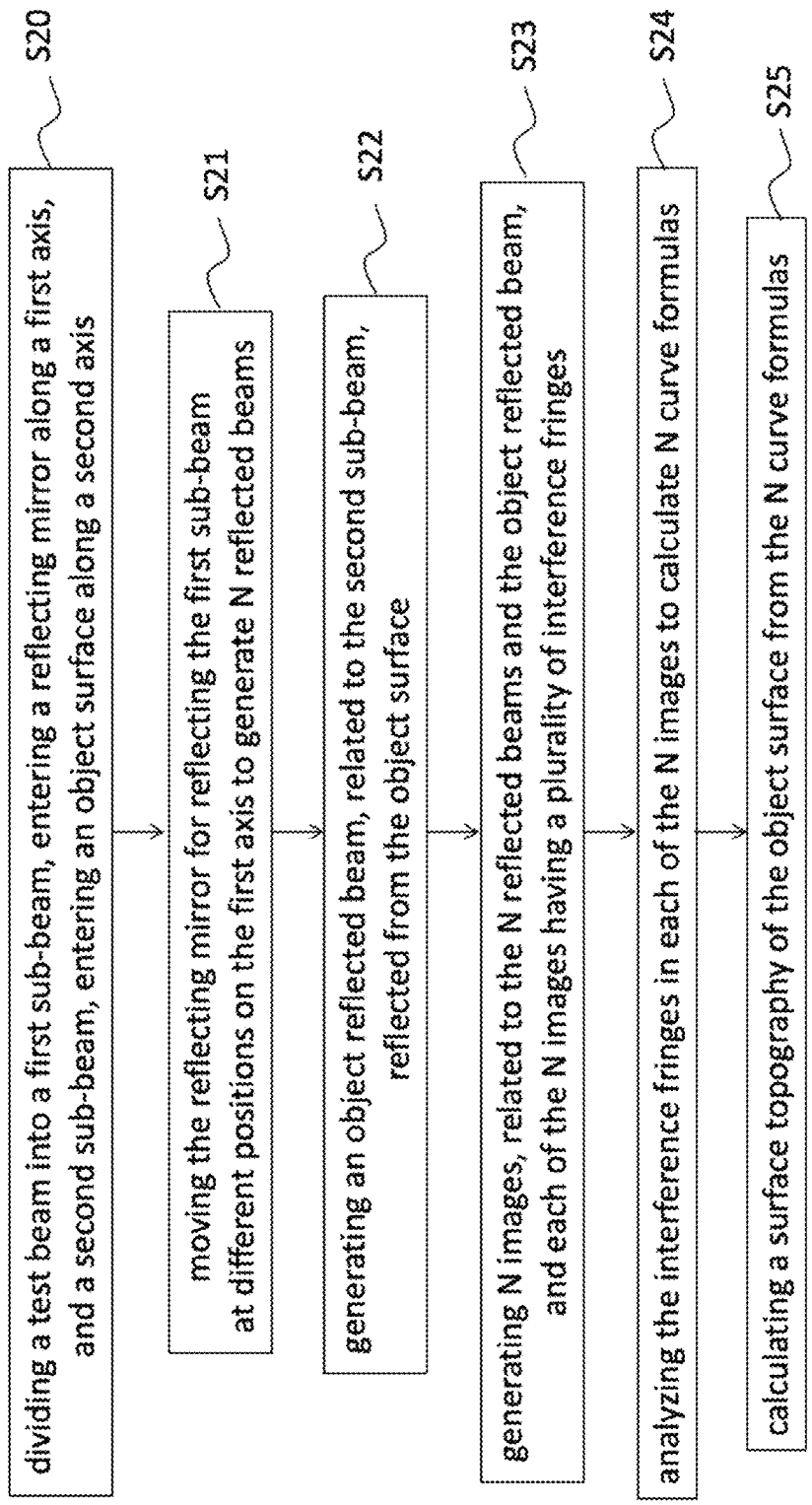
FIG. 3 is a flowchart showing the method of measuring surface topography in accordance with an embodiment of the present invention.

The surface topography measuring system of the foregoing embodiment can be used to illustrate the method of measuring surface topography of the present invention. Please refer to FIG. 1 and FIG. 3 together. FIG. 3 is a flowchart showing the method of measuring surface topography in accordance with an embodiment of the present invention. As shown in the figure, method of measuring surface topography of the present invention comprises the following steps. In step S20, the beam splitter 14 can divide the test beam L1 emitted by the light source 10 into a first sub-beam L11 and a second sub-beam L12. The first sub-beam L11 enters the reflecting mirror 12 along the first axis A, and the second sub-beam L11 enters the object surface 2 along the second axis B. Then in step S21, the reflecting mirror 12 can be moved to different positions on the first axis A to reflect the first sub-beam L11, and the reflected first sub-beam L11 is defined as the reflected beam R11. And in step S22, the second sub-beam L12 reflected from the object surface 2 is defined as the object reflected beam R12. Then in step S23, the photographing device 16 receives the reflected beam R11 and the object reflected beam R12 and generates N images, and each image has a plurality of interference fringes. And in step S24, the processing device 18 analyzes the multiple interference fringes in each image to calculate N curve formulas, such as the above formulas (1) to (4). And in step S25, the processing device 18 calculates the surface topography of the object surface 2 using the N curve formulas. The other steps related to the method of measuring surface topography have been described in the above-mentioned embodiment of the surface topography measuring system, and this embodiment will not be repeated here.

In summary, the method and the system of measuring surface topography provided by the present invention can ensure that the image captured by the photographing device has multiple interference fringes, because the reflecting mirror or object surface is inclined, the first sub-beam or the second sub-beam does not enter the reflecting mirror or object surface perpendicularly. In addition, the processing device can eliminate the phase error value related to the moved reflecting mirror through calculation, so that the surface topography can be measured correctly.

What is claimed is:

1. A method of measuring surface topography, comprising:
    dividing a test beam into a first sub-beam, entering a reflecting mirror along a first axis, and a second sub-beam, entering an object surface along a second axis;
    moving the reflecting mirror for reflecting the first sub-beam at different positions on the first axis to generate N reflected beams;
    generating an object reflected beam, related to the second sub-beam, reflected from the object surface;
    generating N images, related to the N reflected beams and the object reflected beam, and each of the N images having a plurality of interference fringes;
    analyzing the interference fringes in each of the N images to calculate N curve formulas; and
    calculating a surface topography of the object surface from the N curve formulas;
    wherein a first angle is between a first normal line of the reflecting mirror and the first axis, or between a second normal line of the object surface and the second axis, N is a positive integer greater than 2,
    wherein the test beam has a first wavelength, and the step of moving the reflecting mirror for reflecting the first sub-beam at the different positions on the first axis to generate the N reflected beams further comprises:
        setting an $i^{th}$ setting position of the reflecting mirror on the first axis to generate an $i^{th}$ reflected beam among the N reflected beams; and
        setting an $i+1^{th}$ setting position of the reflecting mirror on the first axis to generate an $i+1^{th}$ reflected beam among the N reflected beams;
        wherein the $i^{th}$ setting position and the $i+1^{th}$ setting position are separated by one-eighth of the first wavelength, i is a positive integer smaller than N,
    wherein the step of analyzing the interference fringes in each of the N images to calculate the N curve formulas further comprises:
        selecting a reference line perpendicular to the interference fringes in each of the N images; and
        calculating each of the N curve formulas by curve-fitting the interference fringes on the reference line,
        wherein in the step of calculating each of the N curve formulas by curve-fitting the interference fringes on the reference line, an $i^{th}$ phase error value between the $i^{th}$ reflected beam and the $i+1^{th}$ reflected beam is also obtained during curve-fitting the interference fringes on the reference line.

2. The method of measuring surface topography according to claim 1, wherein each of the N curve formulas comprises a level parameter, an amplitude parameter, and a phase parameter, and the phase parameter is related to the surface topography of the object surface and the $i^{th}$ phase error value.

3. A surface topography measuring system, for measuring a surface topography of an object surface, comprising:
    a light source for providing a test beam;
    a reflecting mirror selectively moving to different positions on a first axis;
    a beam splitter for dividing the test beam into a first sub-beam, entering the reflecting mirror along a first axis, and a second sub-beam, entering the object surface along a second axis;
    a photographing device for receiving the first sub-beam reflected from the reflecting mirror on the first axis, and receiving the second sub-beam reflected from the object surface to generate N images, the first sub-beam reflected from different positions of the reflecting mirror being defined as N reflected beams, and the second sub-beam reflected from the object surface being defined as an object reflected beam, and the N images related to the N reflected beams and the object reflected beam, and each of the N images having a plurality of interference fringes; and
    a processing device, electrically connected to the photographing device, for analyzing the interference fringes in each of the N images to calculate N curve formulas, and calculating the surface topography of the object surface from the N curve formulas;
    wherein a first angle is between a first normal line of the reflecting mirror and the first axis, or between a second normal line of the object surface and the second axis, N is a positive integer greater than 2,
    wherein the test beam has a first wavelength, the reflecting mirror generates an $i^{th}$ reflected beam among the N reflected beams at an $i^{th}$ setting position on the first axis, the reflecting mirror generates an $i+1^{th}$ reflected beam among the N reflected beams at an $i+1^{th}$ setting position on the first axis, and the $i^{th}$ setting position and the $i+1^{th}$ setting position are separated by one-eighth of the first wavelength, i is a positive integer smaller than N,
    wherein the processing device further selects a reference line perpendicular to the interference fringes in each of the N images, and calculates each of the N curve formulas by curve-fitting the interference fringes on the reference line,
    wherein the processing device obtains an $i^{th}$ phase error value between the $i^{th}$ reflected beam and the $i+1^{th}$ reflected beam during curve-fitting the interference fringes on the reference line.

4. The surface topography measuring system according to claim 3, wherein each of the N curve formulas comprises a level parameter, an amplitude parameter, and a phase parameter, and the phase parameter is related to the surface topography of the object surface and the $i^{th}$ phase error value.

* * * * *